United States Patent
Kuczynski et al.

(10) Patent No.: US 11,074,899 B2
(45) Date of Patent: Jul. 27, 2021

(54) VOC SEQUESTERING ACOUSTIC FOAM

(71) Applicant: International Business Machines Corporation, Armonk, NY (US)

(72) Inventors: Joseph Kuczynski, North Port, FL (US); Rebecca Morones, Berthoud, CO (US); Sarah K. Czaplewski-Campbell, Rochester, MN (US); Melissa K. Miller, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 432 days.

(21) Appl. No.: 15/921,935

(22) Filed: Mar. 15, 2018

(65) Prior Publication Data

US 2019/0287509 A1 Sep. 19, 2019

(51) Int. Cl.

| | |
|---|---|
| *C08G 18/22* | (2006.01) |
| *G10K 11/162* | (2006.01) |
| *G11B 33/08* | (2006.01) |
| *C08G 18/76* | (2006.01) |
| *C08K 5/00* | (2006.01) |
| *C08G 18/48* | (2006.01) |

(52) U.S. Cl.
CPC ............ *G10K 11/162* (2013.01); *G11B 33/08* (2013.01); *C08G 18/222* (2013.01); *C08G 18/482* (2013.01); *C08G 18/4829* (2013.01); *C08G 18/7664* (2013.01); *C08G 2350/00* (2013.01); *C08K 5/005* (2013.01)

(58) Field of Classification Search
CPC ............... C08G 18/222; C08G 18/482; C08G 18/4829; C08G 18/7664; C08G 2101/00; C08G 2350/00; C08K 5/005; C08L 75/04; G10K 11/162; G10K 11/168; G11B 33/08
See application file for complete search history.

(56) References Cited

U.S. PATENT DOCUMENTS

| | | | |
|---|---|---|---|
| 7,018,700 B2 | 3/2006 | Park | |
| 8,053,485 B2 | 11/2011 | Lekovic et al. | |
| 9,457,340 B2 | 10/2016 | Buelow et al. | |
| 2009/0234039 A1* | 9/2009 | Schutte | C08G 18/632 521/137 |
| 2017/0132999 A1* | 5/2017 | Coakley | G10K 11/168 |
| 2017/0225114 A1 | 8/2017 | Meirav et al. | |
| 2018/0036673 A1* | 2/2018 | Sundaram | C10L 3/10 |
| 2018/0036688 A1* | 2/2018 | Sundaram | B01D 71/06 |
| 2018/0056246 A1* | 3/2018 | Nair | B01D 61/362 |
| 2018/0065105 A1* | 3/2018 | Song | B01J 20/28035 |

FOREIGN PATENT DOCUMENTS

| | | |
|---|---|---|
| CN | 103249738 A | 8/2013 |
| CN | 105987475 A | 10/2016 |

OTHER PUBLICATIONS

Thermal Management of Large Mainframe Servers Disclosed Anonymously IPCOM000193801D Mar. 9, 2010.

* cited by examiner

*Primary Examiner* — John M Cooney
(74) *Attorney, Agent, or Firm* — Patterson + Sheridan, LLP

(57) ABSTRACT

Acoustic dampeners, methods of making acoustic dampener, and uses thereof are described. The acoustic dampener includes a polymer foam article; and a metal-organic framework portion. The metal-organic framework portion comprises a metal-organic framework in a polymer matrix. The metal-organic framework portion is adhered to, or otherwise coupled to or included with, the polymer foam article. Such an acoustic dampener can be used in a computer equipment cabinet.

19 Claims, 4 Drawing Sheets

VOC SEQUESTERING ACOUSTIC FOAM

BACKGROUND

This application describes acoustic dampeners and methods of making and using such. Particularly, the acoustic dampeners include polymer films having metal-organic frameworks.

Volatile organic compounds (VOCs) emanating from systems and equipment in the environment can have detrimental health effects on exposed individuals. Additionally, depending on the VOC, manufacturers may be required to label systems as non-compliant with specific state regulations (e.g., California Prop 65). During VOC testing, numerous substances of high concern have been detected and identifying their source in a complex system is both tedious and often times unsuccessful. Consequently, it would be beneficial to sequester the VOCs within a system, preventing or minimizing their release into the environment, such that any substance of high concern is within acceptable limits.

Computer systems can generate and emit VOCs from heat cycling of components in the computer system. Such systems are frequently housed in cabinets on racks that include acoustic dampening foam articles to suppress noise from operation of the computer system. Such cabinets often include forced air ventilation systems with air inlet and exit ports.

Attempts have been made to add VOC capturing materials to the foam articles. For example, Kynol (a phenol-aldehyde resin) has been impregnated into polyurethane foam in an attempt to capture VOCs. Such foam dampeners, unfortunately, have reduced acoustic absorption performance. An in-line chemical filter in the exit port of the server has also been contemplated, but back pressure created by the filter results in increased need for cooling capacity. New methods and materials of capturing VOCs from computer servers are needed.

SUMMARY

Embodiments described herein provide an acoustic dampener, comprising a polymer foam article; and a metal-organic framework portion coupled to the polymer foam article, the metal-organic framework portion comprising a metal-organic framework dispersed in a polymer.

Other embodiments described herein provide an equipment cabinet or rack comprising an acoustic dampener attached to a wall of the equipment cabinet, the acoustic dampener comprising: a polymer foam article; and a metal-organic framework portion coupled to the polymer foam article, the metal-organic framework portion comprising a metal-organic framework dispersed in a polymer.

Other embodiments described herein provide a method of making an acoustic dampener, comprising forming a polymer foam article; and adding a metal-organic framework portion to the polymer foam article.

Other embodiments described herein provide a method of removing volatile organic compounds from computing hardware, comprising disposing the computer hardware in a cabinet; applying an acoustic dampener to a wall of the cabinet, the acoustic dampener comprising a polymer foam article; and a metal-organic framework portion coupled to the polymer foam article, the metal-organic framework portion comprising a metal-organic framework dispersed in a polymer; and absorbing volatile organic compounds into the acoustic dampener.

The accompanying figures, which are incorporated in and constitute part of this specification, are included to illustrate and provide a further understanding of the method and system of the invention. Together with the description, the figures serve to explain the embodiments described herein. It is contemplated that features from one embodiment may be beneficially incorporated in other embodiments without further recitation.

BRIEF DESCRIPTION OF THE DRAWINGS

To facilitate understanding, identical reference numerals have been used, wherever possible, to designate identical elements that are common to the figures.

DETAILED DESCRIPTION

Figure 1A:
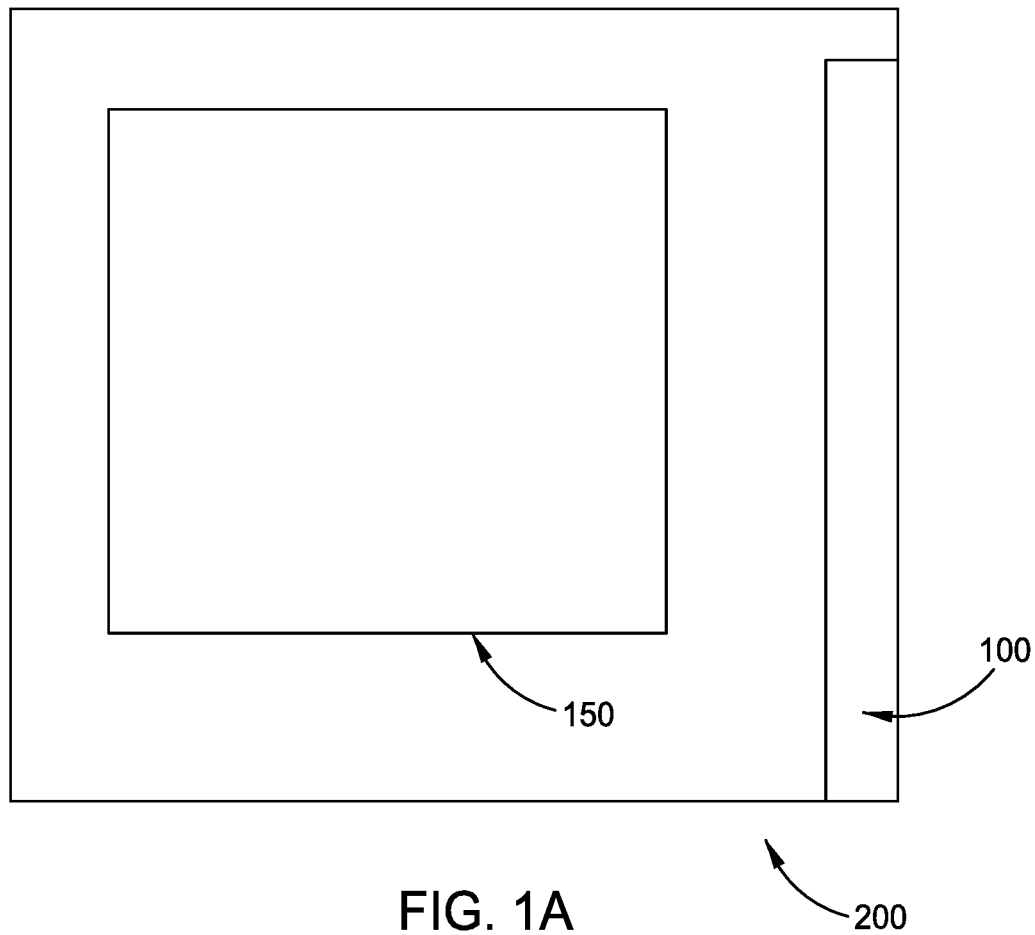
FIG. 1A is a schematic representation of an equipment cabinet including an acoustic dampener according to one embodiment.

In the following description, it is understood that terms such as "top," "bottom," "outward," "inward," and the like are words of convenience and are not to be construed as limiting terms. Reference will now be made in detail to example embodiments of the invention, which are illustrated in the accompanying figures and examples. Referring to the drawings in general, it will be understood that the illustrations are for the purpose of describing a particular embodiment of the invention and are not intended to limit the invention thereto.

Whenever a particular embodiment of the invention is said to comprise or consist of at least one element of a group and combinations thereof, it is understood that the embodiment may comprise or consist of any of the elements of the group, either individually or in combination with any of the other elements of that group. Furthermore, when any variable occurs more than one time in any constituent or in formula, its definition on each occurrence is independent of its definition at every other occurrence. Also, combinations of substituents and/or variables are permissible only if such combinations result in stable compounds.

FIG. 1A is a schematic representation of an equipment cabinet 200 including an acoustic dampener 100 according to one embodiment. The equipment cabinet 200 houses a computer processing system 150 inside, and the acoustic dampener 100 reduces noise from operation of the computer processing system 150. Although only one wall of the equipment cabinet 200 is shown with an acoustic dampener, acoustic dampeners can be applied to more than one wall of the equipment cabinet 200. The acoustic dampener 100 is shown covering the entire wall of the equipment cabinet 200, but other embodiments may feature acoustic dampeners that cover only a portion of a wall, possibly while other walls are completely covered by an acoustic dampener.

The acoustic dampener 100 is a polymer foam article, usually a panel, that is usually adhered to the wall of the equipment cabinet 200 using adhesive or fasteners. Polyurethane is a polymer material frequently used in acoustic dampening foam panels for computer equipment cabinets. Here the acoustic dampener 100 has a polymer film (not shown in FIG. 1A) that includes one or more metal-organic framework (hereinafter "MOF") additives. The polymer film can be adhered to, laminated with, or otherwise incorporated in the polymer foam article. The polymer film may be applied to the foam article on a surface thereof, or incorporated into the body of the foam article. Where the polymer film is applied at the surface of the foam article, the acoustic dampener 100 can be installed in the equipment cabinet 200 with the polymer film facing the interior of the equipment cabinet 200, or with the polymer film against the wall of the equipment cabinet 200. In some cases, the acoustic dampener can include more than one polymer film with metal-organic frameworks.

Figure 1B:
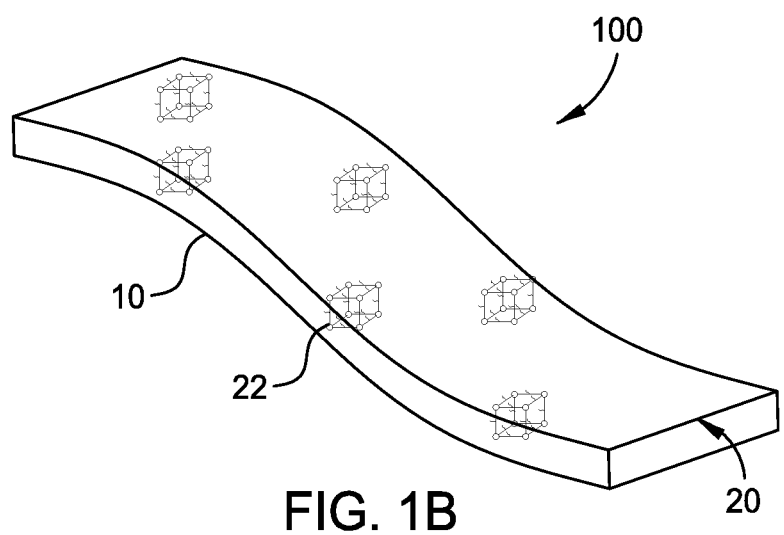
FIG. 1B is a schematic cross-section of an acoustic dampener according to one embodiment.

FIG. 1B is a schematic cross-section of an acoustic dampener 100 according to one embodiment. The acoustic dampener 100 includes a polymer foam article 10; and at least one polymer film 20. The polymer film 20 includes metal-organic framework components 22, and is adhered to the polymer foam article. The metal-organic framework component may be included in the polymer film 20, or may be a layer or coating applied to the polymer film 20. The polymer film may be adhered or laminated, or otherwise attached to or incorporated into the polymer foam article 10.

Non-limiting examples of polymers that can be used to make polymer foams and polymer foam articles include epoxy, phenolic, urea-formaldehyde, and melamine-formaldehyde resins, unsaturated polyesters, polyimides, polyurethane, polyurea, polyisocyanate, polyisocyanurate, polypropylene, polystyrene (PS), polyacrylonitrile (PAN), polyvinylpyrrolidone (PVP), polycarbonates, polyolefins such as polyethylene and polypropylene, silicones, and polyvinyl chloride (PVC), either individually or in combinations of two or more thereof. Some polymer foam materials are interpenetrating polymer networks, for example of PVC and polyurea. Copolymers and multi-polymers of the polymers listed above may also be foamed and used as polymer foam materials. The polymer foam article may have thermal stability up to about 150° C. The polymer foam article may be flame retardant. In one embodiment, a flame-retardant polymer includes a polyurethane material formed by chemically reacting a polyisocyanate with a phosphonate that includes at least one hydroxyl group to form a phosphonate-based polyurethane. In another embodiment, the polymer foam includes other flame retardant materials such as granular inorganic salts. In other embodiments, polymers that are not ordinarily flame retardant, such as conventional polyurethane or polystyrene, can be blended with any of the flame retardant polymers described above. Polyurethane foams can be flexible or rigid depending on cellular structure and molecular weight of the polymer. Polyurethane foams may also include additives such as foaming agents, scavengers, cell openers, foam modifiers, coloring agents, and adhesives, among others.

Figure 1C:
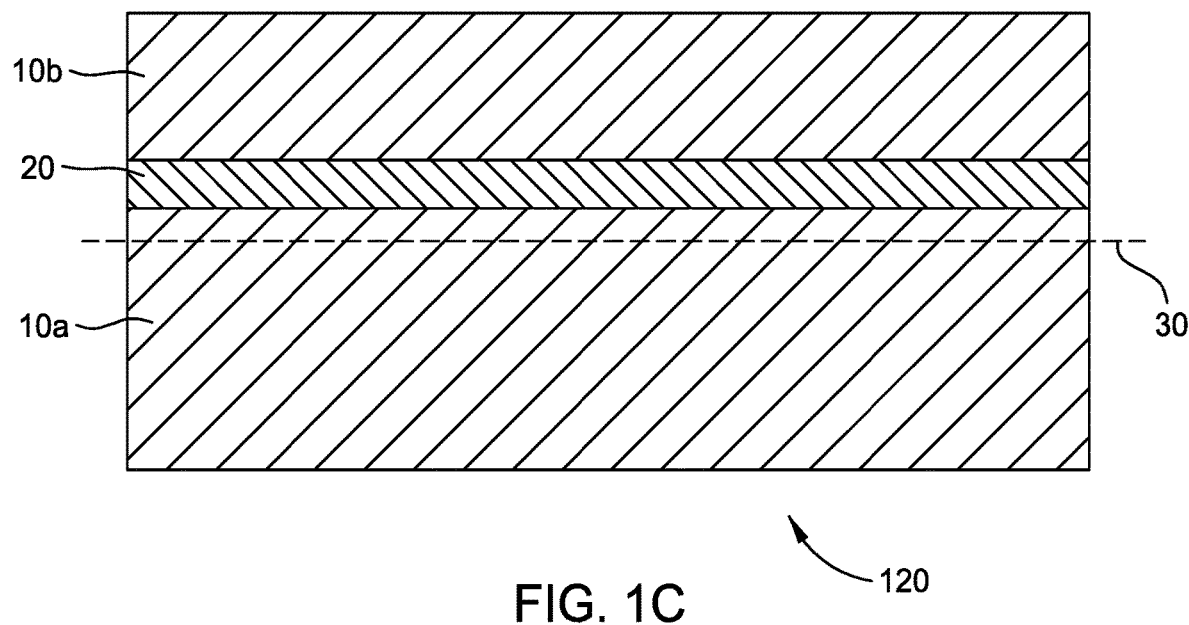
FIG. 1C is a cross-section of an acoustic dampener according to another embodiment.

FIG. 1C is a cross-section of an acoustic dampener 120 according to another embodiment. The acoustic dampener 120 has alternating layers of polymer foam articles 10 and polymer film 20 having metal-organic framework components. Two polymer foam articles 10a and 10b are shown with the polymer film 20 between the polymer foam articles 10a and 10b. In FIG. 1C, the two polymer foam articles 10a and 10b are shown having different thicknesses, such that the polymer film 20 having MOF components is not necessarily located at a mid-point of the thickness of the acoustic dampener 120. Here, the acoustic dampener 120 has a plane 30 bisecting it parallel to the major surfaces of the acoustic dampener 120, and the plane 30 does not intersect the polymer film 20. In other words, the polymer film 20 is closer to one side of the acoustic dampener 120 than to the other side. Said another way, the foam article 10a is thicker than the foam article 10b. In the event the acoustic dampener 120 is used in an elevated temperature environment, the acoustic dampener 120 can be installed such that the polymer film 20 is near a cooling surface to prevent thermal degradation of the acoustic dampener 120.

The acoustic dampener 120 may be made by laminating the polymer film 20 onto one of the polymer foam articles 10a or 10b, and then laminating the other polymer foam article onto the polymer film 20. The lamination may be performed by flame bonding the polymer components together or by applying an adhesive. Alternately, the polymer film 20 can be extruded onto one of the polymer foam articles 10a or 10b, and the other polymer foam article can be applied while the polymer film 20 is molten, or the other polymer foam article can be adhered to the polymer film 20 using adhesive. The polymer foam articles 10a and 10b can have the same composition or different composition. For example, the polymer foam article 10a may be a first polymer foam while the polymer foam article 10b is a second polymer foam different from the first polymer foam.

Figure 1D:
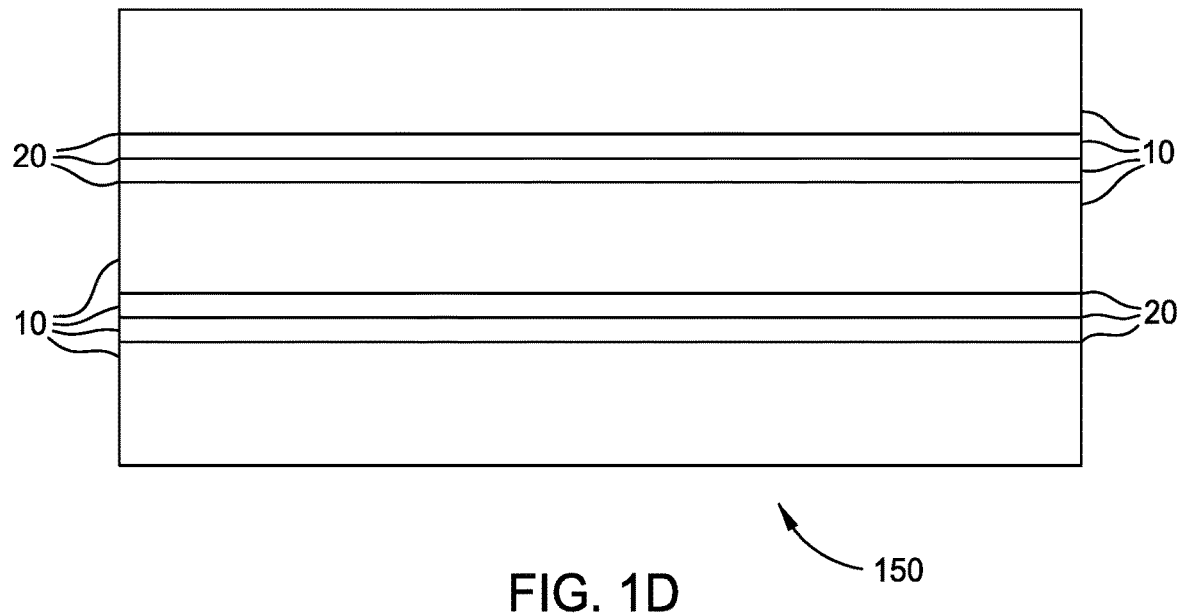
FIG. 1D is a cross-section of an acoustic dampener according to another embodiment.

FIG. 1D is a cross-section of an acoustic dampener 150 according to another embodiment. The acoustic dampener 150 is a multi-layer structure with a plurality of polymer foam articles 10 separated by a plurality of polymer films 20 having MOF components. The polymer foam articles 10 of the acoustic dampener 150 have a variety of thicknesses that can depend on the thermal and chemical environment in which the acoustic dampener 150 will be used, and the polymer foam articles 10 can be the same material or different materials. In this case, three thick polymer foam articles 10 are separated by sub-layers of thin polymer foam articles 10 separated by polymer films 20 having MOF components. Although not shown in FIG. 1D, it should be noted that either exposed surface of the acoustic dampener 150 can be coated with a polymer film 20 having MOF components. It should also be noted that a single polymer film 20 can include more than one type of MOF component, and different polymer films 20 can have different MOF components in the same acoustic dampener. For example a first polymer film 20 of the acoustic dampener 150 can have a first MOF component and a second polymer film 20 of the acoustic dampener 150 can have a second MOF component different from the first MOF component. Furthermore, a first polymer film 20 of the acoustic dampener 150 can have a first MOF mixture and a second polymer film 20 of the acoustic dampener 150 can have a second MOF mixture different from the first MOF mixture.

The multiple polymer films 20 of the acoustic dampener 150 provide a first polymer film 20 for primary VOC capture and a second polymer film 20 for secondary VOC capture. Multiple polymer films 20 provide backup capacity for VOC capture in the event the primary VOC capture film 20 becomes saturated. Additionally, layers of different polymer and materials provide acoustic reflectivity that can enhance dampening.

Figure 1E:
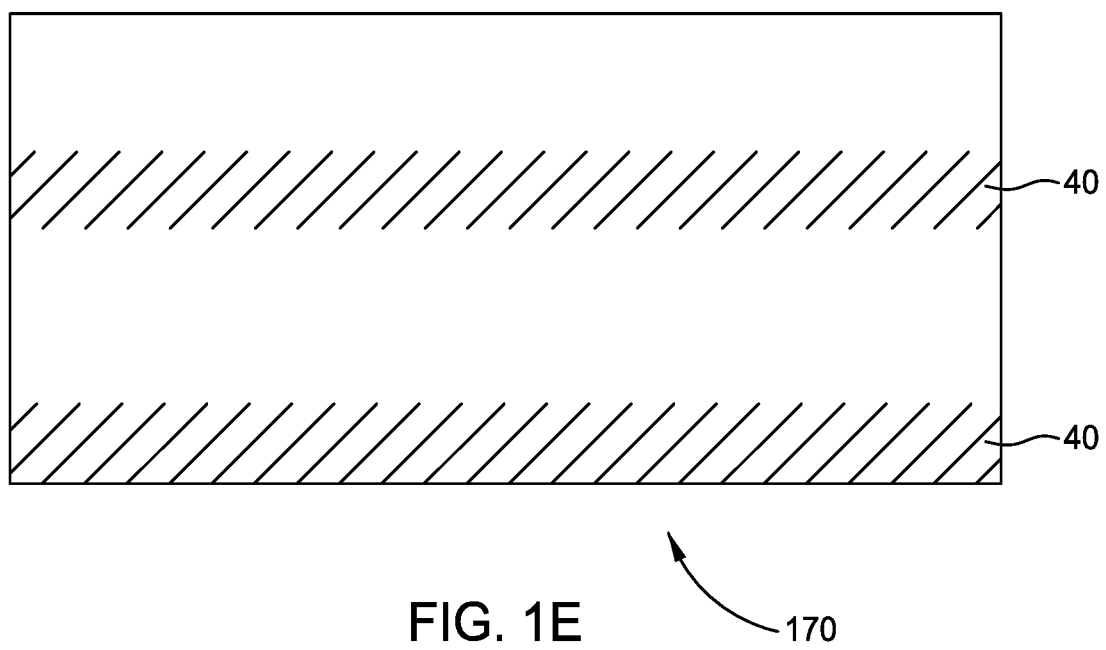
FIG. 1E is a cross-section of an acoustic dampener according to another embodiment.

FIG. 1E is a cross-section of an acoustic dampener 170 according to another embodiment. The acoustic dampener 170 is a unitary foam article having MOF regions 30 that contain MOF components. Such an article can be made by incorporating MOF components into the pre-foam mixture at selected locations to give a foam article with MOF regions at desired locations. For example, if the polymer foam article is made by molding, a first layer of pre-foam material having no MOF components can be poured into the mold, and a second layer of pre-foam material having MOF components can be poured into the mold over the first layer. Upon foaming, a unitary article having an MOF region results. Here, the article is referred to as "unitary" meaning that it has no specific internal interfaces or layers. The MOF regions transition to non-MOF regions, and vice versa, without an identifiable interface or layer boundary. A similar procedure can be followed to make the multi-layer structure 170 using moldable polymer foams. The unitary acoustic dampener 170 has no sharp boundary between the MOF region and the rest of the article, since the MOF region is foamed together with the rest of the polymer. Between the MOF region and the MOF-free region will be a gradient region in which concentration of MOF components falls from the MOF concentration of the MOF region to zero over some distance. Because the acoustic dampener 170 has no sharp boundary between the MOF region and the MOF-free region, the acoustic dampener 170 may have better performance in some situations where a laminate might degrade.

In every embodiment described above, the polymer foam article may be a layered article, or may be made in layers. Thus, a first polymer foam portion may be attached to a second polymer foam portion to make a polymer foam article. The first and second polymer foam portions may be foamed together in one mold, or may be blown together and immediately contacted to make an adhered, layered polymer foam article. Likewise, the polymer film containing MOF components can be applied in layers to achieve a desired thickness. Each layer may have the same thickness, or a first layer may have a first thickness while a second layer has a second thickness different from the first thickness. Each layer may have the same composition, or a first layer may have a first composition while a second layer has a second composition different from the first composition. The first and second compositions may differ by any of type or mixture of polymers in the film, type or mixture of MOF components, and loading of MOF components. Solvent types and amounts can also be different from film to film, and each film may be hardened by removing solvent to varying degrees. For example, a first film may be completely dried and hardened by removing all solvent, a second film may be nearly dried by removing most solvent but leaving the film slightly tacky, and then a third film can be applied to the still-tacky second film.

Loading of MOF components in a polymer for purposes of making any of the structures described herein may be up to about 65% weight of MOF components in total weight of the polymer/MOF mixture. Thus, the polymer/MOF mixture may be up to about 65 wt % MOF. The loading may range from near zero wt % up to about 65 wt %. Typical loading is from about 5 wt % to about 60%, such as from about 10 wt % to about 50 wt %, for example 45 wt %. As noted above, the MOF components may include more than one MOF material, for example a mixture of UiO-66-NH21 and UiO-66, or a mixture of ZIF-8 and ZIF-82.

A MOF is commonly prepared by adding a metal containing compound to an organic material. The metal containing compound reacts with the organic material to form metal-organic bonds. The MOF can be incorporated in a polymer film by dissolving the MOF in an organic solvent and blending the resulting solution into a polymer melt. The MOF solution can also be blended with the polymer precursor mixture prior to polymerization. The MOF can also be added directly to the polymer melt, or polymer precursor mixture, as a powder. Examples of MOF materials that may be used include UiO-66-NH21, UiO-66, ZIF-8, ZIF-82, MOF199, and Mg-MOF-74. Higher loading leads to higher VOC scavenging efficacy, but very high loading can degrade properties of the polymer material carrying the MOF components.

UiO-66-NH21 may be prepared by dissolving $ZrCl_4$ into a mixture of 5 volume-parts dimethyl formamide (hereinafter "DMF") and 1 volume-part HCl. A mixture of 2-amino-4,4'-dicarboxylic acid dissolved in DMF is added to the $ZrCl_4$ mixture at a molar ratio, Zr to acid, of 1:1.4. The resulting mixture is heated overnight at about 80° C. The obtained powders may be isolated by centrifugation and washing with DMF (3×30 mL) followed by immersion in ethanol. The powder can then be dried under vacuum at 150° C.

ZIF-82 can be made by dissolving 1.291 g of $Zn(NO_3)_2 \cdot 4H_2O$ in 100 mL of methanol to make a first solution and dissolving 1.621 g of 2-methylimidazole in 100 mL of methanol to make a second solution. Then the two solutions are mixed and stirred at room temperature for 24 h. The resultant powders may be collected by centrifugation and washed with methanol. The product may be dried under vacuum at 120° C.

Figure 2:
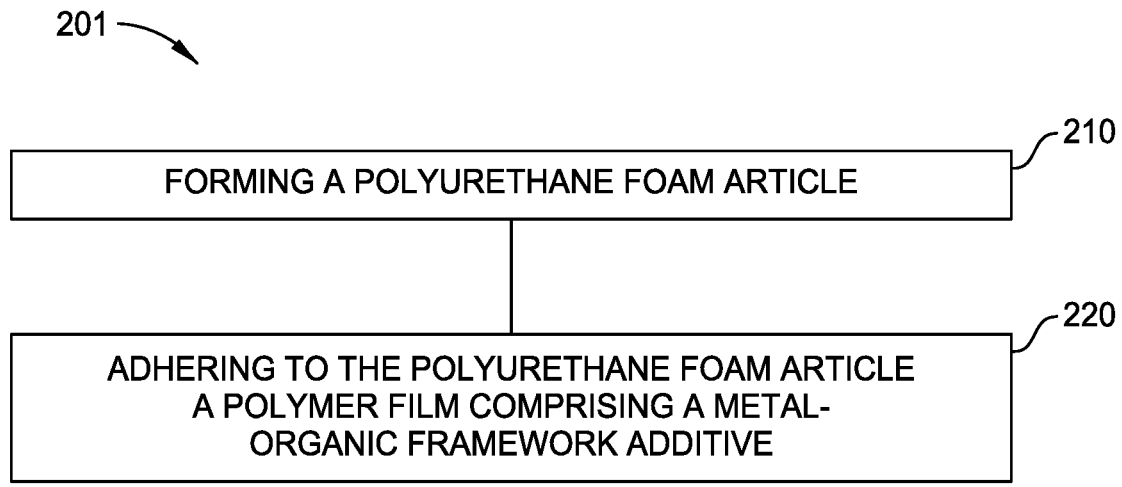
FIG. 2 is a flow diagram summarizing a method of making an acoustic dampener according to one embodiment.

FIG. 2 is a flow diagram summarizing a method 201 of making an acoustic dampener according to one embodiment. The method 201 can be used to make any of the structures described herein, except for the structure of FIG. 1E. At 210, a polymer foam article is formed. The polymer foam article may be any of the polymer foam articles described herein, made from any of the foamable polymer materials and mixtures described herein.

At 220, a polymer film containing one or more polymers and one or more MOF components is applied to the polymer foam article. The polymer film may be applied to the polymer foam article by spraying, pouring, dipping, or coating, or by extruding a polymer mixture containing the MOF components onto the polymer foam article. Alternately, a powder of the MOF components can be applied to the polymer foam article, and the polymer film applied over the powder. In another embodiment, the polymer film containing MOF components can be laminated onto the polymer foam article, and can be adhered by lamination or using adhesive. The polymer film includes one or more polymers and one or more metal-organic framework components. The polymer foam article may be made first, and then the polymer film having MOF components can be applied thereafter. Alternately, the polymer film having MOF components can be applied as the polymer foam article is made. For example, if the polymer foam article is a blown foam, the polymer film can be sprayed on (or otherwise applied) as the polymer foam expands and hardens.

As noted above, the method 201 includes making layered foam articles and applying the polymer film containing MOF components in layers.

Figure 3:
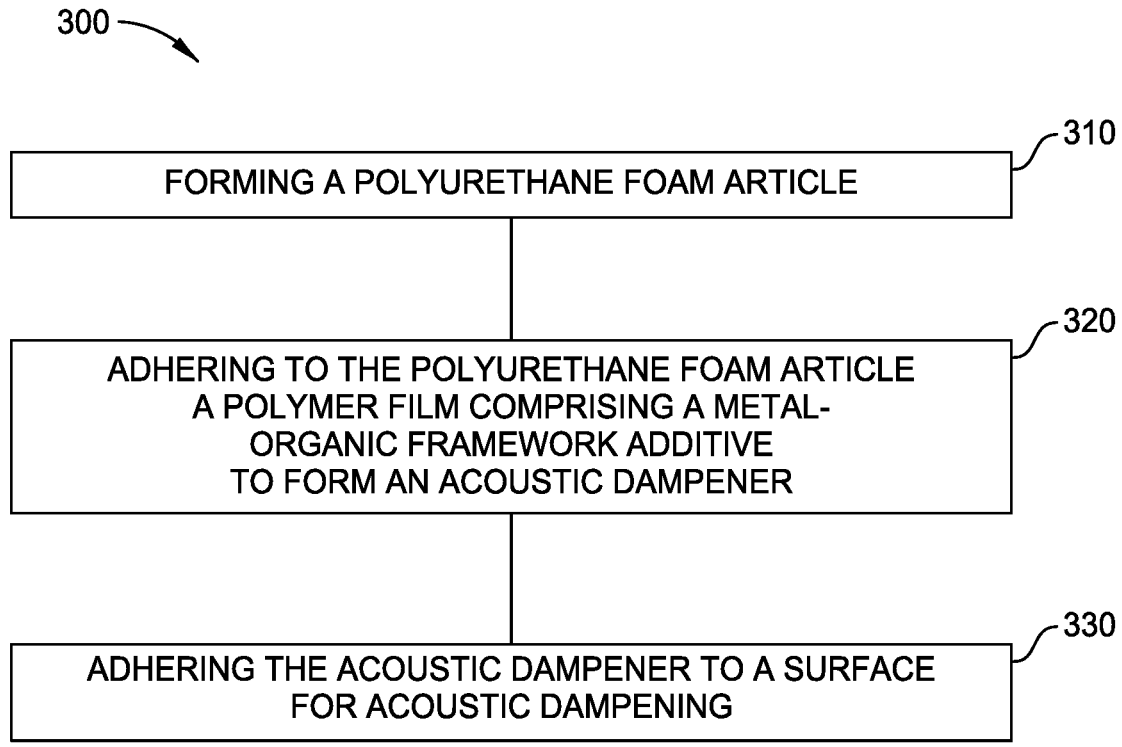
FIG. 3 is a flow diagram summarizing a method of acoustic dampening.

FIG. 3 is a flow diagram summarizing a method 300 of acoustic dampening. At 310, a polyurethane foam article is formed. The polyurethane foam article is generally a panel that can be applied to a surface for acoustic dampening at the surface. At 320, a polymer film having MOF components is adhered to the polyurethane foam article by any of the methods described above to form an acoustic dampener. At 330, the acoustic dampener is applied, attached, or adhered to a surface for acoustic dampening at the surface. For example, the acoustic dampener can be applied to one wall of a computer equipment cabinet, as described in connection with FIG. 1A above.

The polymer film containing MOF components may be prepared by various techniques. The polymer that is to form the continuous matrix of the polymer film, for example PAN or PS, can be dissolved in a solvent such as DMF to form a thin liquid. A solution containing the MOF components can then be blended into the polymer solution. Solvating the polymer and the MOF components aids in dispersion of the MOF components within the polymer film. The resulting mixture can then be applied to a polymer foam article and allowed to dry by evaporating the solvent. The mixture can be pre-concentrated prior to application by evaporating some solvent. The mixture can also be congealed, removing all solvent, and then melted, for example by extrusion, to apply to the polymer foam article. Alternately, as described above, the powder MOF can be added directly to the polymer solution, or the powder MOF can be applied to the surface of the polymer foam article and then covered by applying the polymer, as melt or solution, over the MOF powder.

The methods and apparatus described herein also provide a method of removing volatile organic compounds from computing hardware. The computing hardware is disposed in a cabinet. An acoustic dampener of any sort described herein is applied to the cabinet. Volatile organic compounds from the computing hardware are absorbed into the acoustic dampener. The computing hardware may be disposed on racks in the cabinet. The computing hardware may be operated within the cabinet and/or on the racks. Air may be forced to flow through the cabinet, for example using fans.

While the invention has been described in detail in connection with only a limited number of aspects, it should be understood that the invention is not limited to such disclosed aspects. Rather, the invention can be modified to incorporate any number of variations, alterations, substitutions, or equivalent arrangements not heretofore described, but which are commensurate with the scope of the claims. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An acoustic dampener, comprising:
 a first polymer foam article comprising polyurethane and a foaming agent;
 a second polymer foam article; and
 a metal-organic framework (MOF) portion disposed between the first and second polymer foam article, the metal-organic framework portion comprising a metal-organic framework dispersed in a polymer.

2. The acoustic dampener of claim 1, wherein the polymer of the metal-organic framework portion is selected from the group consisting of epoxy, phenolic resin, urea-formaldehyde resin, melamine-formaldehyde resin, unsaturated polyester, polyimide, polyurethane, polymer formed from polyisocyanate, polypropylene, polystyrene (PS) polyacrylonitrile (PAN), polyvinylpyrrolidone (PVP), polyvinyl chloride, and combinations thereof.

3. The acoustic dampener of claim 1, wherein the polymer of the metal-organic framework portion comprises a copolymer.

4. The acoustic dampener of claim 3, wherein the metal-organic framework portion is attached to a surface of the polymer foam article.

5. The acoustic dampener of claim 1, wherein the metal-organic framework is selected from the group consisting of a zirconium containing compound, a zinc containing compound, and a magnesium containing compound.

6. The acoustic dampener of claim 1, wherein the metal-organic framework portion comprises a plurality of metal-organic frameworks.

7. The acoustic dampener of claim 1, wherein the metal-organic framework portion comprises a first layer having the metal-organic framework and a second layer free of metal-organic framework.

8. The acoustic dampener of claim 1, wherein the acoustic dampener comprises a plurality of metal-organic framework portions.

9. The acoustic dampener of claim 8, wherein the plurality of metal-organic framework portions are separated by polymer foam articles.

10. The acoustic dampener of claim 1, wherein the metal-organic framework portion is a polymer foam.

11. An equipment cabinet comprising:
 an acoustic dampener attached to a wall of the equipment cabinet, the acoustic dampener comprising:
  a first polymer foam article comprising polyurethane and a foaming agent;
  a second polymer foam article; and
  a metal-organic framework portion disposed between the first and second polymer foam article, the metal-organic framework portion comprising a metal-organic framework dispersed in a polymer.

12. The equipment cabinet of claim 11, wherein the polymer of the metal-organic framework portion is selected from a group consisting of epoxy, phenolic resin, urea-formaldehyde resin, melamine-formaldehyde resin, unsaturated polyester, polyimide, polyurethane, polymer formed by polyisocyanate, polypropylene, polystyrene, polyacrylonitrile, polyvinylpyrrolidone, and polyvinyl chloride, and the metal-organic framework is selected from the group consisting of a zirconium containing compound, a zinc containing compound, and a magnesium containing compound.

13. The equipment cabinet of claim 11, wherein the polymer of the metal-organic framework portion comprises a copolymer.

14. The equipment cabinet of claim 11, wherein the metal-organic framework portion is attached to a surface of the polymer foam article facing away from the wall of the equipment cabinet.

15. The equipment cabinet of claim 11, wherein the acoustic dampener comprises a plurality of metal-organic framework portions.

16. The acoustic dampener of claim 1, further comprising an adhesive disposed between the first polymer foam article and the metal-organic framework portion.

17. The acoustic dampener of claim 1, wherein the metal-organic framework portion comprises an MOF loading of about 5 wt % to about 60 wt %.

18. An acoustic dampener, comprising:
 a unitary molded foam article comprising:
  a first polymer foam portion free of metal-organic framework (MOF) MOF components; and
  a second polymer foam portion comprising MOF components dispersed therein, wherein the first polymer foam portion and the second polymer foam portion are foam molded together, wherein the unitary molded foam article is free of internal interfaces between the first polymer foam portion and the second polymer foam portion.

19. The acoustic dampener of claim 18, wherein the unitary molded foam article comprises polyurethane and a foaming agent.

* * * * *